(12) United States Patent
Rosenoff et al.

(10) Patent No.: US 12,072,896 B2
(45) Date of Patent: Aug. 27, 2024

(54) SYSTEMS AND METHODS FOR RANKING ELECTRONIC DOCUMENTS BASED ON QUERY TOKEN DENSITIES

(71) Applicant: RELX Inc., New York, NY (US)

(72) Inventors: Douglas Rosenoff, Raleigh, NC (US); Khanh Vu, Springboro, OH (US)

(73) Assignee: RELX INC., Miamisburg, OH (US)

( * ) Notice: Subject to any disclaimer, the term of this patent is extended or adjusted under 35 U.S.C. 154(b) by 438 days.

(21) Appl. No.: 16/856,422

(22) Filed: Apr. 23, 2020

(65) Prior Publication Data

US 2020/0341990 A1   Oct. 29, 2020

Related U.S. Application Data

(60) Provisional application No. 62/837,428, filed on Apr. 23, 2019.

(51) Int. Cl.
*G06F 16/00* (2019.01)
*G06F 16/2457* (2019.01)
*G06F 16/25* (2019.01)

(52) U.S. Cl.
CPC ...... *G06F 16/24578* (2019.01); *G06F 16/252* (2019.01)

(58) Field of Classification Search
CPC .......................... G06F 16/24578; G06F 16/252
(Continued)

(56) References Cited

U.S. PATENT DOCUMENTS 6,243,713 B1 * 6/2001 Nelson .................... G06F 16/40
                                                              704/235
7,716,216 B1   5/2010 Harik et al.
(Continued)

FOREIGN PATENT DOCUMENTS

| JP | 2010528369 A | 8/2010 |
|---|---|---|
| KR | 1020080017685 A | 2/2008 |
| WO | 2008023904 A1 | 2/2008 |

OTHER PUBLICATIONS

PCT/US2020/029543, Notification of Transmittal of the International Search Report and the Written Opinion of the International Searching Authority, or the Declaration, mailed Jul. 28, 2020.
Alnofaie, Sara, et al. "A novel information retrieval approach using query expansion and spectral-based." International Journal of Advanced Computer Science and Applications (IJACSA), vol. 7, No. 9, 2016. https://pdfs.semanticscholar.org/a57a/2b5704f0906229daa265ae19828fa6c45210.pdf.
(Continued)

*Primary Examiner* — Irete F Ehichioya
*Assistant Examiner* — Shirley D Hicks
(74) *Attorney, Agent, or Firm* — DINSMORE & SHOHL LLP

(57) ABSTRACT

A system including a search engine configured to: determine a search result based on a search query and search query context, extract query tokens from the search query, determine, query token hit set(s) within each search result document, each query token hit set including query token hit(s) within a defined proximity range of a query token centrally-located within the defined proximity range, determine a query token density value (QTDV) between each query token hit and the centrally-located query token for each query token hit set within each document, each QTDV based on a distance between each query token hit and the centrally-located query token, determine a query token density score (QTDS) for each query token hit set, determine a document density score (DDS) for each document, rank or re-rank each document within the search result based on the DDSs, and transmit a ranked/re-ranked search engine result page for presentation.

20 Claims, 4 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 7,966,305 | B2 | 6/2011 | Olsen |
| 8,818,999 | B2 * | 8/2014 | Edala .................. G06F 16/9535 |
| | | | 707/723 |
| 9,223,836 | B1 | 12/2015 | Fletcher et al. |
| 9,779,141 | B2 | 10/2017 | Jain et al. |
| 10,210,282 | B2 | 2/2019 | Hendrey |
| 10,803,126 | B1 * | 10/2020 | Crandall ................ G06N 3/126 |
| 2010/0191758 | A1 | 7/2010 | Peng et al. |
| 2015/0169582 | A1 | 6/2015 | Jain et al. |
| 2018/0096062 | A1 | 4/2018 | Lorge |

OTHER PUBLICATIONS

Frid, Slava, et al. "High precision information retrieval with natural language processing techniques." Lenny Zeltser, 1997, https://zeltser.com/information-retrieval-with-natural-language-processing-techniques/. Accessed Sep. 26, 2019.

European Application No. 20794529.6, Communication Pursuant to Rules 161(2) and 162 EPC, dated Dec. 2, 2021.

* cited by examiner

SYSTEMS AND METHODS FOR RANKING ELECTRONIC DOCUMENTS BASED ON QUERY TOKEN DENSITIES

CROSS-REFERENCE TO RELATED APPLICATIONS

The present disclosure claims priority to U.S. Provisional Patent Application Ser. No. 62/837,428, filed Apr. 23, 2019, entitled "SYSTEMS AND METHODS FOR RANKING ELECTRONIC DOCUMENTS BASED ON QUERY TOKEN DOCUMENT DENSITIES," the entirety of which is incorporated by reference herein.

BACKGROUND

Field

The present disclosure generally relates to the field of electronic document searching. More particularly, disclosed embodiments relate to computerized systems and methods for electronic document searching that rank, re-rank, and/or measure search results by relevance.

Technical Background

Users often utilize a search engine search query to get a quick answer to a question. Unfortunately, users are often required to sift through a plurality of irrelevant search results before a document relevant to their inquiry is revealed. Often compounding the issue is the use of Boolean operators. If Boolean operators are used in the search query, an improperly utilized Boolean operator may undesirably omit material documents from the search results altogether. Accordingly, users may choose to enter natural language in the search query. However, conventional natural language search algorithms may have problems deciphering relatively long, multiple-word natural language queries, natural language queries including multiple concepts (e.g., related and/or distinct), natural language queries including mixed search modes (e.g., natural language search and entity search), and natural language queries including statistically common (e.g., domain specific) terms in a corpus. Illustrative search queries demonstrating such issues include: "fraud by misappropriation", "motion to dismiss," "accepted as true," "2nd DCA", "private cause of action Constitutional right to privacy employer", "What statute requires a power of attorney to be recorded conveyances act?", and/or the like. Such issues may further "bury" a material document within a plurality of irrelevant search results thus rendering the user's answer anything but quick.

A related problem is that of adequately measuring the relevance of a search result. While this problem is a critical one for measuring the objective utility of a specific document returned by a particular algorithm in response to a specific query, there are relatively few methods for computing search relevance, each of which is subject to specific assumptions, strengths, and/or weaknesses. Thus, reliable new methods that improve the state of the art in search relevance measurement are highly desirable.

Accordingly, improved algorithms for ranking, re-ranking and/or measuring search results based on search query search terms are desired to improve search engine result sets.

SUMMARY

In a first aspect, a system for ranking electronic documents may include a search application device and a search engine device. The search application device may include a processor and a non-transitory computer-readable medium including program instructions. The program instructions, when executed by the processor, cause the processor to: receive, via one or more than one graphical user interface, a search query and a search query context, from a client device. The search engine device may include a processor and a non-transitory computer-readable medium including program instructions. The program instructions, when executed by the processor, cause the processor to: determine a search result based on the search query and the search query context, extract query tokens from the search query, determine, one or more than one query token hit sets within each document of the search result, wherein each query token hit set includes one or more than one query token hits within a defined proximity range of a query token centrally-located within the defined proximity range, determine a query token density value (QTDV) between each query token hit and the centrally-located query token for each query token hit set within each document, wherein each QTDV is based on a distance between each query token hit and the centrally-located query token of each query token hit, determine a query token density score (QTDS) for each query token hit set within each document, determine a document density score (DDS) for each document, rank or re-rank each document within the search result based on the DDS determined for each document, and transmit a ranked or re-ranked search engine result page to the search application device for presentation via the client device.

In a second aspect, a search engine may include a processor and a non-transitory computer-readable medium including program instructions, the program instructions, when executed by the processor, cause the processor to: execute a search query and a search query context to determine an initial search result, extract query tokens from the search query, extract a defined proximity range, determine, one or more than one query token hit set within each document of the initial search result, wherein each query token hit set includes one or more than one query token hit within the defined proximity range of a query token centrally-located within the defined proximity range, determine a query token density value (QTDV) between each query token hit and the centrally-located query token for each query token hit set within each document, wherein each QTDV is based on a distance between each query token hit and the centrally-located query token of each query token hit, determine a query token density score (QTDS) for each query token hit set within each document, determine a document density score (DDS) for each document, and re-rank each document within the initial search result based on the DDS determined for each document to generate a re-ranked search engine result page.

In a third aspect, a computer-implemented method for ranking electronic documents may include: receiving, via a search application device, a search query and a search query context, determining, via a search engine, a search result based on the search query and the search query context, and executing a query token density algorithm of the search engine to: extract query tokens from the search query, determine, one or more than one query token hit set within each document of the search result, wherein each query token hit set includes one or more than one query token hit within a defined proximity range of a query token centrally-located within the defined proximity range, determine a query token density value (QTDV) between each query token hit and the centrally-located query token for each query token hit set within each document, wherein each QTDV is based on a distance between each query token hit and the centrally-located query token of each query token hit, determine a query token density score (QTDS) for each query token hit set within each document, determine a document density score (DDS) for each document, rank or re-rank each document within the search result based on the DDS determined for each document, and transmit a ranked or re-ranked search engine result page to the search application device for presentation via a client device.

Additional features and advantages of the aspects described herein will be set forth in the detailed description which follows, and in part will be readily apparent to those skilled in the art from that description or recognized by practicing the aspects described herein, including the detailed description which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figures 1, 2:
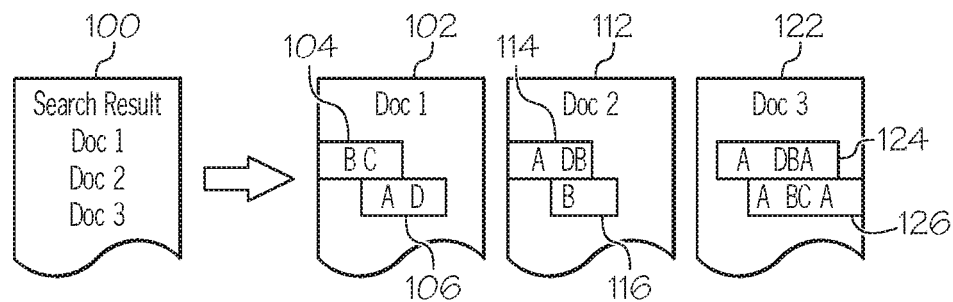
FIG. 1 depicts an illustrative search result as well as illustrative documents of the search result where a plurality of query tokens have been identified via a plurality of query token identifiers, according to one or more embodiments shown and described herein.
FIG. 2 depicts an illustrative data file that tracks the plurality of query tokens associated with each document of the search result, according to one or more embodiments shown and described herein.

Reference will now be made in detail to various aspects of determining a query token document density for each document of a plurality of search result documents and ranking or re-ranking the search result documents based on the determined query token document densities, examples of which are illustrated in the accompanying drawings. Whenever possible, the same reference numerals will be used throughout the drawings to refer to the same or like parts.

Various aspects of the present disclosure are directed to systems and methods for searching a corpus of electronic documents. According to various aspects, the corpus of electronic documents may include but are not limited to court opinions, statutes, secondary material, news articles (e.g., Lexis, Lexis Uni, or the like), legal-related cases, or the like in various countries (e.g., U.S., Canada, Australia, UK, or the like). Aspects of the present disclosure extend into different content types, domains and/or languages. According to various aspects, the electronic documents may be searched using natural language processing such that a user is enabled to type query terms into a text field without requiring Boolean connectors. For example, the user may enter "fear of future identity theft" into a search box of a search engine interface without any Boolean connectors. In other aspects, Boolean connectors may be used but ignored by the search algorithm.

According to aspects of the present disclosure, one or more than one natural language search algorithm may search the document corpus for relevant electronic documents that include at least some of the query terms. In some aspects, electronic documents of the corpus having query terms close to one another (e.g., clustered together) may be considered more relevant to the user's entered query than electronic documents of the corpus having query terms relatively dispersed throughout the document (e.g., not clustered together).

Various aspects of the present disclosure analyze a document's query token density. According to various aspects, as more fully described herein, query token density may be a weighted measurement distance between co-occurrences of query tokens (e.g., natural language search query terms) within a specific neighborhood (e.g., a defined proximity range) around a particular query token location (e.g., a portion of the document). In some aspects, query tokens appearing within the defined proximity may be given weights proportional to a distance from a query token positioned at a center of the defined proximity range.

Various aspects of the present disclosure may re-rank an order of an original or initial search result based on query token proximity, as described herein. In such aspects, electronic documents having clustered query terms (e.g., query terms relatively close to one another) may be boosted over electronic documents having dispersed query terms (e.g., query terms relatively further from one another) in a re-ranked list presentable to the user via an electronic display. In other aspects, such a re-ranking may not occur. In such aspects, query token proximity, as described herein, may have already been taken into account during the initial search result determination or calculation.

A computer-implemented method, according to various aspects of the present disclosure, may include determining query terms (e.g., alternatively referred to herein as query tokens) within each electronic document (e.g., of a search result) that are proximate to one another within a defined proximity range (e.g., query tokens within 5 tokens of each other, query tokens within 10 tokens of each other, and/or the like). According to various aspects, the proximity range may be a predefined proximity range (e.g., preset before run-time) and/or a user-selectable proximity range (e.g., selectable ad hoc via a user interface or the like).

Continuing the example herein, a natural language query may be "fear of future identify theft". In such an aspect, each query token (e.g., query term) may be assigned a query token identifier. For ease of illustration, the query token "fear" may be identified by "A", the query token "future" may be identified by "B", the query token "identity" may be identified by "C", and the query token "theft" may be identified by "D". It should be appreciated that each respective query token identifier may include a letter(s), a number(s), a symbol(s), and/or the like to identify (e.g., uniquely) each query token of a search query. In such cases, multiple query tokens may be combined to create a single query token (e.g., in the search query "fear of future identity theft", the query tokens "identity theft" may be interpreted as a single query token). According to various aspects, using a plurality of query token identifiers may simplify the query token proximity analyses.

FIG. 1 depicts an illustrative search result as well as illustrative documents of the search result where a plurality of query tokens have been identified via a plurality of query token identifiers, according to various aspects of the present disclosure. Referring to FIG. 1, the search result 100 (e.g., provided via a search engine result page on a user interface) may include Document 1 ("Doc 1") 102, Document 2 ("Doc 2") 112, Document 3 ("Doc 3") 122 or the like. In view of FIG. 1, in each document (e.g., Doc 1 102, Doc 2 112, Doc 3 122), each query token (e.g., "fear", "future", "identity", "theft", or the like) may be identified by its respective query token identifier (e.g., "A", "B", "C", "D", or the like). Furthermore, in each document (e.g., Doc 1 102, Doc 2 112, Doc 3 122, or the like), for each query token (e.g., "fear", "future", "identity", "theft", or the like), other query tokens (e.g., of the search query), that are positioned within the defined proximity range, are identified.

In view of FIG. 1, for example, it has been determined, in a first portion of Doc 1 102, that a first query token hit set 104 includes the query token hit "B" (e.g., "future") as within the defined proximity range of query token "C" (e.g., "identity"). Further, it has been determined, in a second portion of Doc 1 102, that a second query token hit set 106 includes the query token hit "A" (e.g., "fear") as within the defined proximity range of the query token "D" (e.g., "theft"). Viewing the first query token hit set 104 in light of the second query token hit set 106, the query token hit "B" is depicted as relatively closer in proximity to the query token "C" and the query token hit "A" is depicted as relatively further in proximity from the query token "D".

Similarly, in view of FIG. 1, it has been determined, in a first portion of Doc 2 112, that a third query token hit set 114 includes the query token hits "A" and "B" as within the defined proximity range of query token "D". Further, it has been determined, in a second portion of Doc 2 112, that a fourth query token hit set 116 includes no query token hit(s) (e.g., "A", "B", "C", "D", or the like) within the defined proximity range of query token "B".

Yet further, in view of FIG. 1, it has been determined, in a first portion of Doc 3 122, that a fifth query token hit set 124 includes the query token hits "A", "B", and "A" as within the defined proximity range of query token "D". Further, it has been determined, in a second portion of Doc 3 122, that a sixth query token hit set 126 includes query token hits "A", "C", and "A" as within the defined proximity range of query token "B". In view of the fifth query token hit set 124, the query token hit "B" and a first instance of the query token hit "A" are depicted as relatively close in proximity to the query token "D" while a second instance of the query token hit "A" is depicted as relatively further in proximity from the query token "D". Similarly, in view of the sixth query token hit set 126, the query token hit "C" is depicted as relatively close in proximity to the query token "B" while a first instance of the query token hit "A" and a second instance of the query token hit "A" are depicted as relatively further in proximity (e.g., about equidistant) from the query token "B".

FIG. 2 depicts an illustrative data file 202 (e.g., of database 637 of FIG. 6) that tracks the plurality of query tokens associated with each document of the search result, according to various aspects of the present disclosure. Referring to FIG. 2, a first plurality of rows (e.g., row 204, row 206, or the like) may be associated with a first document (e.g., Doc 1 102), a second plurality of rows (e.g., row 208, row 210, or the like) may be associated with a second document (e.g., Doc 2 112), and a third plurality of rows (e.g., row 212, row 214, or the like) may be associated with a third document (e.g., Doc 3 122).

In view of FIG. 2, the data file 202 may record information associated with each query token hit set (e.g., query token hit sets 104, 106, 114, 116, 124, 126, and/or the like). Referring to FIG. 2, a query token density score (QTDS) 216 may be associated with each row (e.g., rows 204-214, and/or the like) of the data file 202. According to various aspects of the present disclosure, each QTDS 216 may be determined based on the relative positions of the query tokens within each query token hit set (e.g., query token hit sets 104, 106, 114, 116, 124, 126, and/or the like). In various aspects, a query token density value (QTDV) may be determined between pairs of query tokens within each query token hit set and combined to calculate the QTDS 216. In some aspects, for example, a QTDV may be based on a distance (e.g., number of tokens) between a query token and another query token within a query token hit set. In such aspects, for example, query tokens relatively closer in proximity to one another may receive a QTDV relatively higher than query tokens relatively further in proximity from one another.

Referring briefly to FIG. 1, Doc 1 102 may include the first query token hit set 104 (e.g., query token hit "B" within a defined proximity range of query token "C") and the second query token hit set 106 (e.g., query token hit "A" within the defined proximity range of query token "D"). Turning now to FIG. 2, in light of FIG. 1, since the query token hit "B" is relatively closer in proximity to query token "C", the first query token hit set 104 is assigned a relatively higher QTDS 216 of "3" in row 204 of the data file 202 and since query token hit "A" is relatively further in proximity from query token "D", the second query token hit set 106 is assigned a relatively lower QTDS 216 of "1" in row 206 of the data file 202.

Similarly, Doc 2 112 may include the third query token hit set 114 (e.g., query token hits "A" and "B" within the defined proximity range of query token "D") and the fourth query token hit set 116 (e.g., with no query token hits within the defined proximity range of query token "B"). With respect to the third query token hit set 114, since the query token hit "A" is relatively further in proximity from the query token "D" it may be assigned a relatively lower QTDV and since query token hit "B" is relatively closer in proximity to query token "D" it may be assigned a relatively higher QTDV such that the third query token hit set 114 is assigned a QTDS 216 of "3" in row 208 of the data file 202. With respect to the fourth query token hit set 116, since no query token is within the defined proximity range of query token "B", the fourth query token hit set 116 is assigned a QTDS 216 of "0" in row 210 of the data file 202. According to aspects of the present disclosure, a query token hit set having only query token(s) outside the defined proximity range (e.g., fourth query token hit set 116) is associated with a default QTDS of "0".

Yet further, Doc 3 122 may include the fifth query token hit set 124 (e.g., query token hits "A", "B", and "A" within the defined proximity range of query token "D") and the sixth query token hit set 126 (e.g., query token hits "A", "C", and "A" within the defined proximity range of query token "B"). With respect to the fifth query token hit set 124, since the first instance of query token hit "A" is relatively closer in proximity to the query token "D" it may be assigned a relatively higher QTDV and since the second instance of query token hit "A" is relatively further in proximity from query token "D" it may be assigned a relatively lower QTDV. Further, since query token hit "B" is closer in proximity to the query token "D" than the first instance of query token hit "A" it may be initially assigned a higher QTDV than the first instance of query token hit "A". However, according to various aspects of the present disclosure a QTDV assigned to a repeated query token hit within the defined proximity range (e.g., the first instance of query token hit "A" and the second instance of query token hit "A") may be increased by a predetermined factor (e.g., repeated query token hits within the defined proximity range may indicate higher relevance of that portion of the document). Accordingly, the QTDV initially assigned to the first and/or second instance of query token hit "A" may be increased or boosted above the QTDV initially assigned to the query token hit "B". In view of row 212 of the data file 202, when the QTDVs of the fifth query token hit set 124 are combined, the fifth query token hit set 124 is assigned a QTDS 216 of "12". Similarly, with respect to the sixth query token hit set 126, since the first instance of query token hit "A" and the second instance of query token hit "A" are similar in proximity to the query token "B" they may be assigned a QTDVs. Further, since query token hit "C" is closer in proximity to the query token "B" than either of the first or second instance of query token hit "A" it may be initially assigned a higher QTDV than the first and second instance of query token hit "A". However, as described herein, a QTDV assigned to a repeated query token hit within the defined proximity range may be increased by a predetermined factor. Accordingly, the QTDV initially assigned to the first and/or second instance of query token hit "A" may be increased or boosted above the QTDV initially assigned to the query token hit "B". In view of row 214 of the data file 202, when the QTDVs of the sixth query token hit set 126 are combined, the sixth query token hit set 126 is assigned a QTDS 216 of "10".

Referring still to FIG. 2, after a QTDS 216 has been assigned to each query token hit set of each electronic document (e.g., Doc 1 102, Doc 2 112, Doc 3 122, or the like) of the search result, a document density score (DDS) 218 may be determined for each of the electronic documents. According to various aspects of the present disclosure, the DDS 218 may be determined based on one or more than one QTDS 216 assigned to the respective query token hit sets of the electronic document. In some aspects, for example, the DDS 118 may be a sum of the QTDSs 216 associated with each electronic document. Continuing the example, referring to FIG. 2, summing the QTDS of the first query token hit set 104 (e.g., "3" of row 204) and the QTDS of the second query token hit set 106 (e.g., "1" of row 206) results in a DDS 118 for Doc 1 102 of "4". Similarly, summing the QTDS of the third query token hit set 114 (e.g., "3" of row 208) and the QTDS of the fourth query token hit set 116 (e.g., "0" of row 210) results in a DDS 118 for Doc 2 112 of "3". Yet further, summing the QTDS of the fifth query token hit set 124 (e.g., "12" of row 212) and the QTDS of the sixth query token hit set 126 (e.g., "10" of row 214) results in a DDS 118 for Doc 3 122 of "22".

Figure 3:
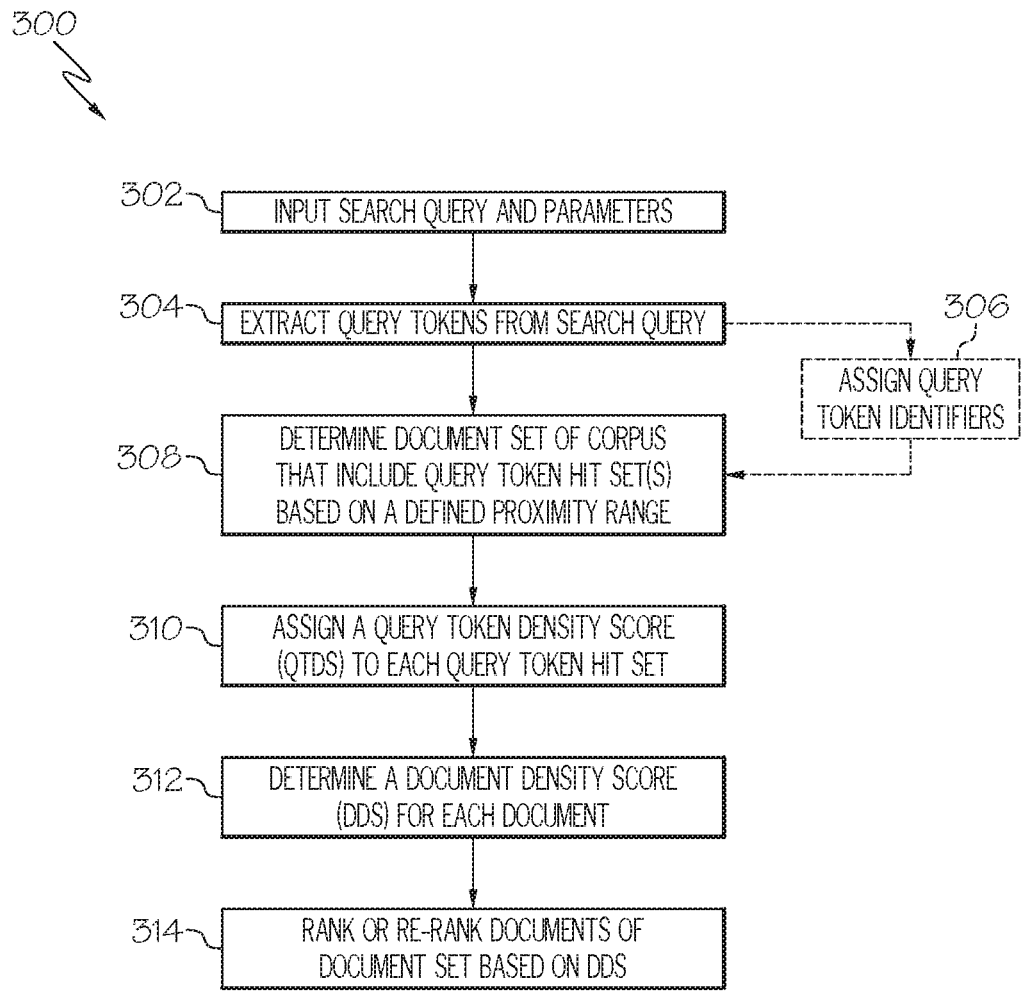
FIG. 3 depicts a flow diagram of an illustrative process for ranking or ranking electronic documents of a search result based on document density scores, according to one or more embodiments shown and described herein.

FIG. 3 depicts a flow diagram of an illustrative process 300 for ranking or ranking electronic documents of a search result based on document density scores, according to various aspects of the present disclosure. At block 302, a search query (e.g., search string comprising query tokens) and search query parameters (e.g., defined proximity range, maximum document rank value to be re-ranked, and/or the like) may be received. At block 304, query tokens may be extracted from a search query. As described herein, a user may enter a search query including natural language (e.g., with or without Boolean connectors) into a search box of a search engine interface. In response, the search algorithm of the present disclosure may extract query tokens from the search query based on a query token database file 617 (e.g., FIG. 6). According to various aspects, the query token database file 617 may be tailored to a subject matter and/or domain of interest (e.g. query tokens associated with court opinions, and/or the like). In some aspects, the query token database file 617 may extract query tokens based on a synonyms list (e.g., to extract, as query tokens, synonyms of query terms entered in the search query). In other aspects, the query token database file 617 may extract query tokens based on a mathematical vector associated with a query token. At block 306, depicted in phantom as optional, each extracted query token may be assigned a token identifier. At block 308, a defined proximity range (e.g., preset or user-selected) may be used to determine a result set of electronic documents from a corpus of documents that include one or more than one query token hit set. At block 310, a QTDS, as described herein, may be assigned to each query token hit set. At block 312, a DDS, as described herein, may be determined for each electronic document of the results set. At block 314, the result set may be ranked or re-ranked (e.g., if the result set was initially ranked based on another or separate ranking algorithm) based on the DDSs. According to various aspects, the result set may be re-ranked by simple re-ranking (e.g., numerical), sequential re-ranking, smart re-rankers (e.g., rankings based on optimum results from several processes (e.g., learning to rank processes where QTD results are integrated as features into a learning to rank feature matrix)), and/or the like.

Ranking or Re-Ranking Search Results

Figure 4:
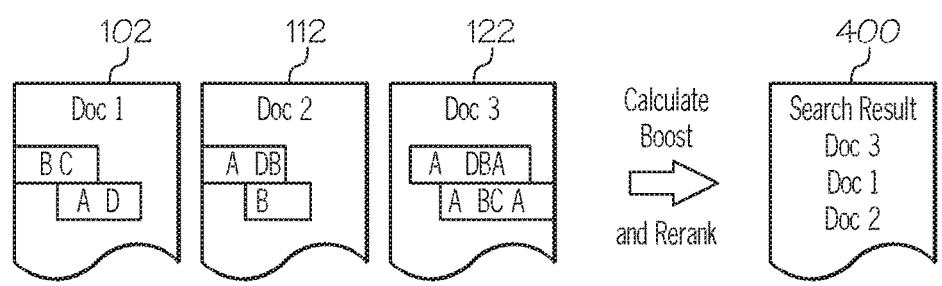
FIG. 4 depicts an illustrative document density-based search result ranked or re-ranked based on document density scores, according to one or more embodiments shown and described herein.

FIG. 4 depicts an illustrative document density-based search result 400 ranked or re-ranked based on document density scores (DDSs), according to various aspects of the present disclosure. Referring to FIG. 4, Doc 3 122 (e.g., having a DDS of "22" in FIG. 2) is ranked at a first position in the document density-based search result 400. Here, if the search engine has already determined a search result 100 (FIG. 1 & FIG. 6 e.g., using another ranking algorithm 628N), Doc 3 122 has been re-ranked from a third position to the first position in the document density-based search result 400. Further in view of FIG. 4, Doc 1 102 (e.g., having a DDS of "4" in FIG. 2) is ranked at a second position in the document density-based search result 400. Here, if the search engine has already determined the search result 100, Doc 1 102 has been re-ranked from the first position to the second position in the document density-based search result 400. Yet further, in FIG. 4, Doc 2 112 (e.g., having a DDS of "3" in FIG. 2) is ranked at a third position in the document density-based search result 400. Here, if the search engine has already determined the search result 100, Doc 2 112 has been re-ranked from the second position to the third position in the document density-based search result 400.

According to various aspects of the present disclosure pseudocode to rank or re-rank documents within a search engine results page (SERP) may include:

```
Loop over documents in SERP
   Loop over all query tokens in each document
   /*make each query term the central query token in a QTDS
   calculation*/
      Determine QTDV for each query token within each query token hit
      set
      Determine QTDS for each query token hit set
         Sum QTDV in each query token hit set
      Determine DDS for each document
         Sum QTDS for all query token hit sets
   End Loop over query terms in each document
End Loop over documents
Re-rank based on DDS
```

According to some aspects of the present disclosure, a document boost (DB) may be calculated to boost documents within an initial search result 100 (e.g., FIG. 1) based on associated DDSs to realize a document density-based search result. In such an aspect, the DDS calculated for each respective document of the initial search result may be multiplied by each respective document's search result rank within the initial search result. Continuing the example, Doc 1 102 having a search rank of "1" in the initial search result and a DDS of "4" may be assigned a DB of "4" (e.g., 1×4=4). Similarly, Doc 2 112 having a search rank of "2" in the initial search result and a DDS of "3" may be assigned a DB of "6" (e.g., 2×3=6) and Doc 3 122 having a search rank of "3" in the initial search result and a DDS of "22" may be assigned a DB of "66" (e.g., 3×22=66). In such an aspect, Doc 1 102 may be re-ranked from the first position to the third position, Doc 2 112 may remain the second position, and Doc 3 122 may be re-ranked from the third position to the first position in the document density-based search result (not shown). Here, it should be understood that documents may be similarly de-boosted rather than boosted within a document density-based search result based on their DDS.

The ranking or re-ranking of search result documents, as described herein, leads to higher visibility of the most relevant search result documents to a user within a search interface. According to aspects of the present disclosure, search result documents having a plurality of query tokens clustered together are more relevant than search result documents having a few or no query tokens clustered together. By having the most relevant search result documents at the top of the list, the user can see the most relevant documents first.

Assigning a Query Token Density Score (QTDS)

According to various aspects of the present disclosure, each QTDS associated with each query token hit set may be assigned based on a distance between a query token and another query token within the query token hit set. In one aspect, each token/word within each document (e.g., of a search result) being analyzed may be a distance increment.

Figure 5:
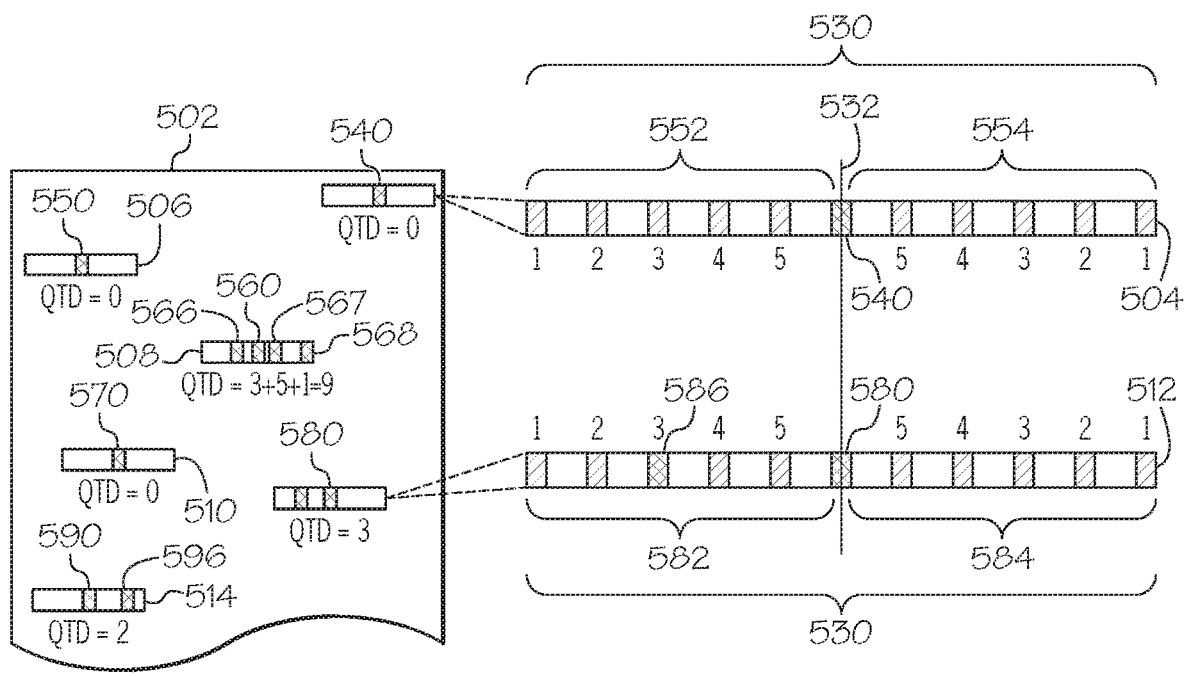
FIG. 5 depicts an illustrative document for which a plurality of QTDVs are determined based on distances between query tokens, according to one or more embodiments shown and described herein.

FIG. 5 depicts an illustrative document 502 for which a plurality of QTDSs are assigned based on distances between query tokens, according to various aspects of the present disclosure. Referring to FIG. 5, the illustrative search result document 502 may include a query token hit set A 504, a query token hit set B 506, a query token hit set C 508, a query token hit set D 510, a query token hit set E 512, and a query token hit set F 514. In light of FIG. 5, each query token hit set 504, 506, 508, 510, 512, 514, or the like, may be located within a different portion of the document 502. In FIG. 5, the query token hit set A 504 and the query token hit set E 512 are magnified from the document 502 for purposes of illustration. In light of query token hit set A 504 and query token hit set E 512 a defined proximity range 530 has been established (e.g., pre-selected or selected/input via a user interface of the search engine). More specifically, as illustrated in FIG. 5, a token/word count or distance increment of "10" has been established as the defined proximity range 530. In some aspects, all query token hits sets 504-514 of the document 502 have the defined proximity range 530. In other aspects, one or more than one of the query token hit sets 504-514 may have a different defined proximity range (e.g., based on a query token of interest, and/or the like).

According to various aspects described herein, a half-width (HW) may be utilized when assigning QTDVs and/or QTDSs associated with the query token hit sets of a search result document. In such aspects, the HW may equal half of the defined proximity range (e.g., 10/2=5, HW=5). The HW may be used to establish a number of tokens/words before and after a query token located at a center of the defined proximity range of a query token hit set as discussed herein. According to various aspects, a HW=5 has been determined as a reasonable half-width in the context of legal-related documents. Half-widths may be similarly determined for other subject matter areas, domains, and/or content types (e.g., may be 3 for news articles, may be 10 for collegiate materials, or the like).

With respect to the query token hit set A 504, for a first query token 540 positioned at a center 532 of the defined proximity range 530, a first group of tokens/words 552 (e.g., numbered 1-5) precede the first query token 540 and a second group of tokens/words 554 (e.g., numbered 1-5) follow the first query token 540. Here, each token/word of the first group 552 may be numbered starting with a number that is half of the defined proximity range 530 (e.g., the half-width, HW=10/2=5) and decrease in numerical order away from the first query token 540 toward a beginning of the defined proximity range 530 as depicted in FIG. 5. Similarly, each token/word of the second group 554 may be numbered starting with a number that is half of the defined proximity range 530 (e.g., the half-width, HW=10/2=5) and decrease in numerical order away from the first query token 540 toward an end of the defined proximity range 530 as depicted in FIG. 5. Numbering each token/word within the defined proximity range 530 as such enables query tokens located closer to the first query token 540 to be assigned a relatively larger QTDV and query tokens located further from the first query token 540 to be assigned a relatively smaller QTDV, as described herein. In such a manner, query tokens relatively closer to the first query token 540 are boosted (e.g., signaling that the query token hit set A 504 may be more relevant to the user's search query) over query tokens relatively further from the first query token 540.

Referring still to FIG. 5, the query token hit set A 504 does not include a query token hit, other than the first query token 540, within the defined proximity range 530. Accordingly, the query token hit set A 504 may be assigned a QTDS of "0" (e.g., similar to the fourth query token hit set 116 as described herein). Since there is no query token hit other than the first query token 540, no QTDV is determined. In a similar manner, the query token hit set B 506 does not include a query token hit, other than a second query token 550, within the defined proximity range 530 and the query token hit set D 510 does not include a query token hit, other than a fourth query token 570, within the defined proximity range 530. Accordingly, the query token hit set B 506 and the query token hit set D 510 may also each be assigned a QTDS of "0" and no QTDVs are determined.

With respect to the query token hit set E 512, for a fifth query token 580 positioned at a center 532 of the defined proximity range 530, a first group of tokens/words 582 (e.g., numbered 1-5) precede the fifth query token 580 and a second group of tokens/words 584 (e.g., numbered 1-5) follow the fifth query token 580. Here, each token/word of the first group 582 may be numbered starting with a number that is half of the defined proximity range 530 (e.g., the half-width, HW=10/2=5) and decrease in numerical order away from the fifth query token 580 toward a beginning of the defined proximity range 530 as depicted in FIG. 5. Similarly, each token/word of the second group 584 may be numbered starting with a number that is half of the defined proximity range 530 (e.g., the half-width, HW=10/2=5) and decrease in numerical order away from the fifth query token 580 toward an end of the defined proximity range 530 as depicted in FIG. 5. Numbering each token/word within the defined proximity range 530 as such enables query tokens located closer to the fifth query token 580 to be assigned a relatively larger QTDV and query tokens located further from the fifth query token 580 to be assigned a relatively smaller QTDV, as described herein. In such a manner, query tokens relatively closer to the fifth query token 580 are boosted (e.g., signaling that the query token hit set E 512 may be more relevant to the user's search query) over query tokens relatively further from the fifth query token 580.

In this vein, still referring to FIG. 5, the query token hit set E 512 includes a query token hit 586, other than the fifth query token 580, within the defined proximity range 530. Here, according to various aspects of the present disclosure, a QTDV may be determined between pairs of query tokens within each query token hit set and combined to calculate the QTDS. Accordingly, a QTDV may be determined for the query token pair including query token hit 586 and the fifth query token 580. In view of FIG. 5, since the query token hit 586 is positioned "3" distance increments (e.g., 3 token/word counts) away from the fifth query token 580, the query token hit set E 512 may be assigned a QTDS of "3". In a similar manner, the query token hit set F 514 includes a query token hit 596, other than a sixth query token 590, within the defined proximity range 530. In view of FIG. 5, since the query token hit 596 is positioned "4" distance increments (e.g., 4 token/word counts) away from the sixth query token 590, the query token hit set F 514 may be assigned a QTDS of "2". Yet further, in a similar manner, the query token hit set C 508 includes a query token hit 566, a query token hit 567, and a query token hit 568 other than a third query token 560 within the defined proximity range 530. In view of FIG. 5, since the query token hit 566 is positioned "3" distance increments (e.g., 3 token/word counts) away from the third query token 560, the query token pair including the query token hit 566 and the third query token 560 may be assigned a QTDV of "3". Similarly, since the query token hit 567 is positioned "1" distance increment (e.g., 1 token/word count) away from the third query token 560, the query token pair including the query token hit 567 and the third query token 560 may be assigned a QTDV of "5". Yet further, since the query token hit 568 is positioned "5" distance increments (e.g., 5 token/word counts) away from the third query token 560, the query token pair including the query token hit 568 and the third query token 560 may be assigned a QTDV of "1". Accordingly, the query token hit set C 508 may be assigned a QTDS of "9" (e.g., 3+5+1=9).

In light of FIG. 5, as described herein, the DDS for the search result document 502 may ultimately be determined as 14 (e.g., 0+0+9+0+3+2=14) for purposes of ranking or re-ranking the search result document 502 within a document density-based search result similar to as described herein.

Further in light of FIG. 5, in some aspects of the present disclosure, the token at each position (e.g., 5, 4, 3, 2, 1 on each side of a centrally-located query token) may not be evaluated (e.g., some token positions skipped). In one aspect, for example, every other token position (e.g., within the defined proximity range) may be evaluated as described herein rather than every token position (e.g., within the defined proximity range). Such aspects may decrease computation time and increase efficiency as a performance tuning enhancement (e.g., reduced computer resource consumption) while not compromising the relevancy of the ranked/re-ranked search results produced. This may buttress other efficiency aspects of the present disclosure (e.g., direct evaluation of search result documents rather than requiring any pre-processing of the search result documents, and/or the like).

Discount Function and Density Function

As described herein, query tokens located relatively closer to a centrally positioned query token of a defined proximity range may be assigned a relatively larger QTDV and query tokens located relatively further from the centrally positioned query token of the defined proximity range may be assigned a relatively lower QTDV. In this vein, according to various aspects of the present disclosure, an increasingly discount density value may be applied at each distance increment (e.g., token/word count) away from the centrally positioned query token of a query token hit set.

According to various aspects, a discount function (DF) may be defined. In some aspects, the DF may be an inverse of a distance increment (e.g., token/word count) from the centrally positioned token (e.g., DF=1/HW). Here, continuing the example of FIG. 5, the DF may be 0.2 (e.g., ⅕=0.2). It should be appreciated that a more complex DF may be used (e.g., DF=1/log(HW), DF=1/(HW)$^2$, and/or the like).

Further in such aspect, a QTDV assignable to a query token hit may be calculated using a density function that applies the calculated DF (e.g., QTDV=1+(1−distance to query token hit)(DF)). Here, continuing the example in view of FIG. 5, a query token hit at one distance increment away from the first query token 540 may be assigned a QTDV of "1.8" (e.g., 1+(1−(1)(0.2))=1.8). Similarly, a query token hit at two, three, four, and five distance increments away from the first query token 540 may be assigned a QTDV of "1.6", "1.4", "1.2" and "1.0", respectively (e.g., both toward the beginning and toward the end of the defined proximity range 530). It should be appreciated that more complex density functions may be used (e.g., linear, probability, comparison word to vector [word2vec] cosine, BERT, and/or the like).

Testing a Query Term Density(QTD)-Based Algorithm

Discounted Cumulative Gain (DCG) is a metric used to assess the quality of a search result ranking and/or the effectiveness of a search engine algorithm. Accordingly, DCG of the QTD-based algorithm of the present disclosure is evaluated herein.

It has been hypothesized that application of the QTD-based algorithm of the present disclosure to a natural language search query would result in improved human DCG (hDCG) (relevance rankings determined by statistically combining ratings from human subject matter experts) and engagement DCG (eDCG) scores (relevance rankings determined by statistically combining ratings from user/customers). Table 1 below details sample queries and their corresponding initial QTD hDCG results. In such aspects, a total of 40 queries were rated to a rank depth of twenty (20) by three (3) independent subject matter experts in a blind testing process.

TABLE 1

Initial Selected QTD hDCG Results

| Query | hDCG[3] (%) | hDCG[5] (%) | hDCG[10] (%) |
| --- | --- | --- | --- |
| Fraud by Misappropriation | +52 | +55 | +21 |
| Motion to dismiss "accepted as true" "2$^{nd}$ DCA" private cause of action | +46 | +29 | +12 |
| Constitutional right to privacy employer | +7 | +18 | +14 |
| What statute requires a power of attorney to be recorded conveyances act | +17 | +17 | +26 |

Table 2 below details corresponding initial QTD hDCG baseline testing results. In such aspects, one-thousand eighty-six (1,086) queries were rated to a depth of ten (10) by three (3) independent subject matter experts in a blind testing process.

TABLE 2

Initial QTD hDCG Baseline Testing

Average hDCG Results Across Baseline Dataset hDCG[3] = +4.01%
hDCG[5] = +4.03%
hDCG[10] = +1.6%
Jaccard Index [3]/[5]/[10] = 0.73/0.75/0.80 = AVG. 0.76
Rank Bias Overlap [3]/[5]/[10] = 0.74/0.76/0.79 = AVG. 0.73

QTD-Based Algorithm Adjustments

Various aspects of the present disclosure may include adjusting a QTDV (e.g., corresponding to a pair of query terms within a query token hit set) and/or a QTDS (e.g., combined QTDVs of a query token hit set) as described herein. In such aspects, tokens/words that are within the defined proximity range but not within in the search query (e.g., not query tokens) may be analyzed.

In one aspect, the QTDV and/or QTDS may be weighted higher or lower based on text (e.g., tokens) that surround a particular query token (e.g., a centrally positioned query token, another token within the query token hit set). For example, if that text/token is within the defined proximity range, a QTDV and/or QTDS associated with that particular query token may be weighted higher or lower.

In another aspect, the QTDV and/or QTDS may be weighted higher or lower (e.g., a multiplier [e.g., 1.3 or the like] may be applied) based on high-value text or low-value text, respectively. According to various aspects, high-value text may include, for example, a citation (e.g., to a court opinion, statute, and/or the like), an entity found within a database (e.g., certain people, places, and/or the like), a Shephard's® link, a Keycite™ flag, a semantic fact (e.g., US 2019 Gross Domestic Product, and/or the like). Here, for example, if a certain person's name is a token within the defined proximity range, a QTDV and/or QTDS associated with that query token hit set may be weighted higher or lower than a query token hit set not including the certain person's name.

In yet another aspect, the QTDV and/or QTDS may be weighted higher or lower based on sentiment analysis terms and/or tokens exhibiting strong-emotion or sentiment. In some aspects, if positive or negative sentiment terms (e.g., lawsuit, subpoena, and/or the like) or tokens exhibiting strong positive or negative emotion are within the defined proximity range, a QTDV and/or QTDS associated with that query token hit set may be weighted higher or lower, respectively, over those that do not.

In further aspects, the QTDV and/or QTDS may be weighted higher or lower based on other tokens (e.g., hidden markers in the files, specific terms not in the search query, an undesired aspect of the document [e.g., source, content type, staleness date, or the like] and/or the like) within the defined proximity range.

In yet further aspects, the QTDV and/or QTDS may be weighted higher or lower based on a document field (e.g., title segment, headnote segment, body segment, and/or the like of a document). If a query token is within a particular document field, a QTDV and/or QTDS associated with that query token may be weighted higher or lower.

In still further aspects, the QTDV and/or QTDS may be weighted higher when query tokens appear in order (e.g., search query order) in a search result document, when synonyms (e.g., dog or canine) to query tokens are found within the defined proximity range, and/or the like.

QTD-Based Algorithm Extensions

According to various aspects of the present disclosure a calculated QTDV (e.g., corresponding to a pair of query terms within a query token hit set), QTDS (e.g., combined QTDVs of a query token hit set), and/or DDS (e.g., combined QTDSs of a document) may be utilized to trigger other events (e.g., facet displays [e.g., place in side display in interface], user interface (UI) changes to enhance document content [e.g., underlining, highlighting], and/or the like). In some aspects, one or more of the adjustments discussed herein (e.g., weightings) may trigger another event. Accordingly, various combinations of weightings and extensions of the calculated QTDVs, QTDSs, and/or DDSs are contemplated herein.

QTD as a Search Metric

According to further aspects of the present disclosure, a calculated QTDV (e.g., corresponding to a pair of query terms within a query token hit set), QTDS (e.g., combined QTDVs of a query token hit set), and/or DDS (e.g., combined QTDSs of a document) may be used as a precision and/or relevance metric for a document, a search engine results page (SERP), a dataset, and/or the like (e.g., QTD used as a relevance ruler rather than for a ranking or re-ranking method).

Figure 6:
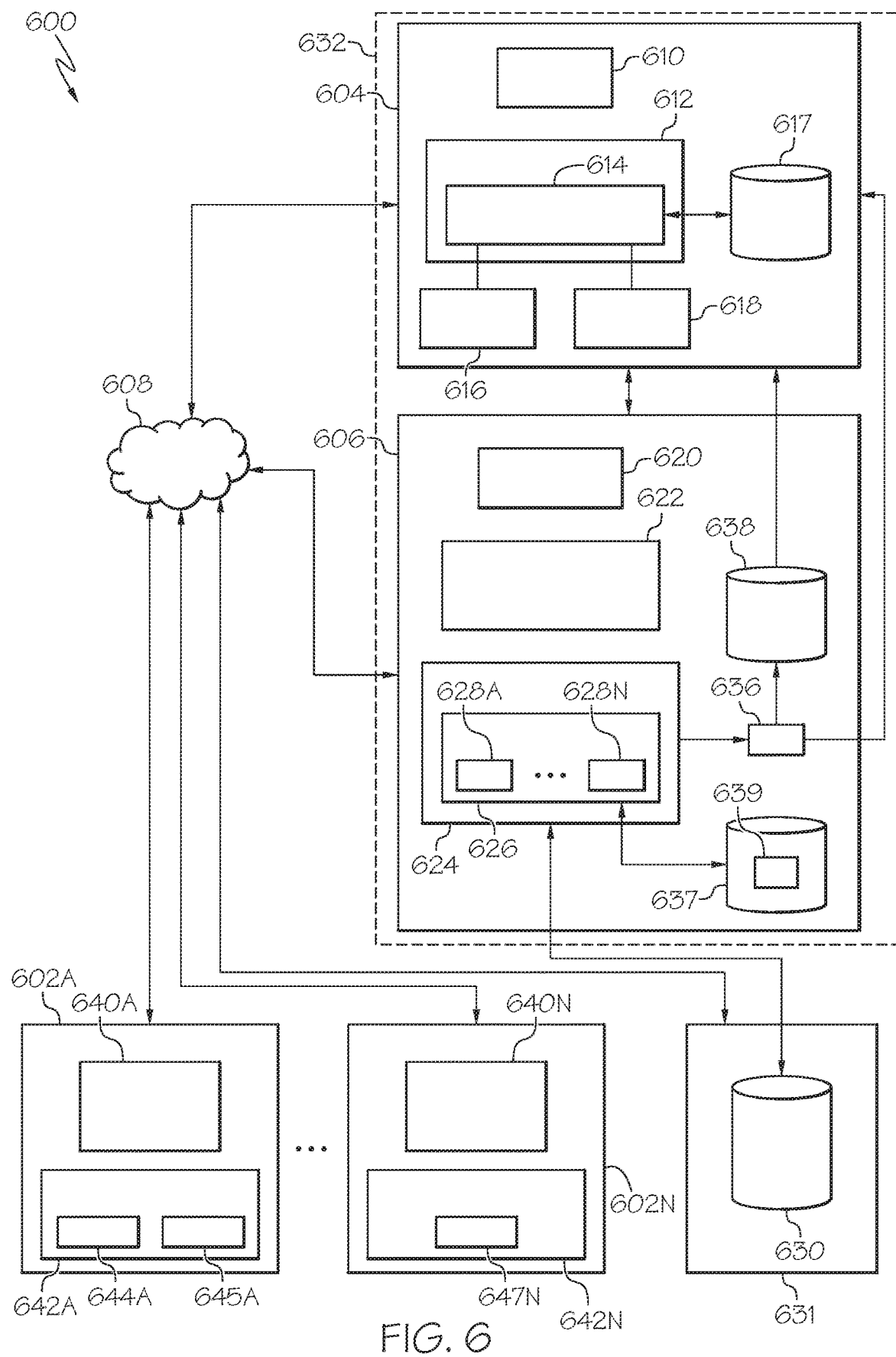
FIG. 6 depicts an illustrative QTD system, according to one or more embodiments shown and described herein.

In some aspects, in its most basic form, a search result derived from the QTD algorithm, as described herein, may be evaluated against a search result derived from another algorithm of a search engine's algorithm stack 626 (FIG. 6).

According to various aspects, a DDS calculated for each of a plurality of documents in a SERP may be used as a raw score. In such aspects, that raw score may be used in a manner similar to relevance computation methods including term frequency-inverse document frequency (TF-IDF) and/or Okapi Best Match 25 (BM25).

In further aspects, a maximum rank value (e.g., maximum of 20 search results) may be selected (e.g., via a search engine user interface, or the like) for a SERP. In such aspects, the DDS for each document of an initial search result may be calculated. Here, each search result document having a DDS placing it at or above the maximum rank value may be assigned to its respective rank index to create a Rank QTD value duple for each rank (e.g. 1-20) in the SERP. In such aspects, ranked DDSs may be further evaluated. In some aspects, if the DDSs decrease monotonically with rank, the search results may exhibit ordered relevance and precision. In other aspects, if the DDSs do not decrease monotonically with rank (e.g., ranking includes one or more than one anomalous DDS), there may be a lapse of precision within the search results, a misplaced document(s), an inaccessible document(s), and/or the like at the anomalous rank(s).

In yet further aspects, DDSs may be used to measure an overall relevance of a SERP. In particular, a maximum rank value (e.g., maximum of 20 search results) may be selected (e.g., via a search engine user interface, or the like) for the SERP, the DDS for each document of an initial search result may be calculated, and each search result document having a DDS placing at or above the maximum rank value may be assigned a ranking (e.g., 1-20). Here, the DDSs of the ranked search result documents may be summed to generate an overall SERP QTD score. Further in such aspects, various DDSs within the ranking (e.g., DDSs at particular ranks, intermediate DDS rank pairs, and/or the like) may be evaluated. For example, the DDS for each document at ranks 3, 5, 10 and 20 may be extracted to evaluate and compare behavior at each rank (e.g., similar to the way a DCG is calculated at various levels of a SERP to distinguish precision). In another example, an intermediate DDS rank pair (e.g., ranks 3 and 4) may be compared against another relevance metric (e.g., DCG, Precision, ERR, and/or the like) to validate the QTD-based assumption (e.g., that relatively high query term density is proportional to relatively high search result document relevance) or highlight an anomalous result against computational assumptions inherent in other relevance metric methods.

In still further aspects, DDSs may be used to limit recall. Here, DDSs calculated for individual search result documents, DDSs calculated to a maximum rank value, and/or DDSs used to calculate an overall SERP QTD score, as described herein, may be used to determine a minimum precision threshold (e.g., QTD-based precision). In such aspects, search result documents having DDSs below that minimum precision threshold may be deemed insignificant or irrelevant (e.g., especially when correlated with a low or an insignificant TF/IDF score and/or BM25 score) and trimmed from the SERP (e.g., reducing the recall of the overall search query to only more significant results). For example, if the minimum precision threshold is "5", 5,000 documents with a DDS of "3" may be trimmed to make the system relatively quicker in presenting more relevant results. In some aspects, an average rank where precision drops (e.g., below the minimum precision threshold) may be determined (e.g., in a manner similar to TF/IDF and/or BM25, normalized for comparison) to suitably limit recall.

QTD Search Algorithm System

FIG. 6 depicts an illustrative QTD system 600 for executing a QTD search algorithm to provide QTD-ranked documents in response to a search query and search query context, according to various aspects of the present disclosure. Referring to FIG. 6, the QTD system 600 may include a plurality of client devices 602A-602N, a search application device 604, a search engine device 606, and a network 608. In view of FIG. 6, the plurality of client devices 602A-602N, the search application device 604, and the search engine device 606 may be communicatively coupled via the network 608. Here, it should be understood that although a particular number of components are depicted in FIG. 6, the QTD system 600 may include any number of these components. Further, functions provided by one or more components of the QTD system 600 may be combined into one component, or distributed across a plurality of components. For example, the search application device 604 and/or the search engine device 606 may be implemented using a server farm including several main servers as well as several backup servers. In addition, the search application device 604 and/or the search engine device 606 may be implemented by distributing various processing steps, as discussed herein, across multiple servers. Similarly, the functions of each client device 602A-602N, the search application device 604, and/or the search engine device 606 may be combined into a single device. It should be understood that disclosed aspects may be implemented by computer devices or workstations organized as shown, organized in a distributed processing system architecture, or organized in myriad of suitable combinations of software, hardware, and/or firmware.

According to aspects of the present disclosure, the network 608 may be a shared, public, and/or private network, may encompass a wide area network or local area network, and/or may be implemented through any suitable combination of wired and/or wireless communication networks. In some aspects, the network 608 may include an intranet or the Internet.

The search application device 604, according to aspects described herein, may include a computer device (e.g., a network computer, a server, a mainframe computer, and/or the like). In some aspects, the search application device 604 may be configured as a special purpose computer (e.g., a particular machine) designed specifically for performing the functionalities described herein. For example, one or more of the disclosed processing steps may be implemented on a field-programmable gate array ("FPGA"), application-specific integrated circuit ("ASIC"), or suitable chipset. The search application device 604 may include one or more than one processor 610 that may be selectively activated and/or reconfigured by a computer program. In particular, the processor 610 may perform steps or methods consistent with disclosed aspects by reading program instructions from memory 612, and executing the program instructions. The memory 612 may include a non-transitory computer-readable medium including one or more than one memory (e.g., RAM, ROM, and/or the like) or storage device (e.g., magnetic storage) that store data as well as computer programs/software. The memory 612 may store program modules that, when executed by the processor 610, perform one or more steps discussed herein. According to various aspects of the present disclosure, the search application device 604 may include a search application 614 (e.g., stored in the memory 612) configured to receive a search query and search query context from a user. In particular, the search application 614 may be configured to provide one or more than one graphical user interface (GUI) to receive user query inputs. According to various aspects, in view of FIG. 6, the search application 614 may generate a search query interface 616 and/or a search query context interface 618 for a user to interact with the search application 614. In some aspects, the search query interface 616 and the search query context interface 618 may be combined into one interface.

The search engine device 606, according to aspects described herein, may include a computer device (e.g., a network computer, a server, a mainframe computer, and/or the like). In some aspects, the search engine device 606 may be configured as a special purpose computer (e.g., a particular machine) designed specifically for performing the functionalities described herein. For example, one or more of the disclosed processing steps may be implemented on a field-programmable gate array ("FPGA"), application-specific integrated circuit ("ASIC"), or suitable chipset. The search engine device 606 may include one or more than one processor 620 that may be selectively activated and/or reconfigured by a computer program. In particular, the processor 620 may perform steps or methods consistent with disclosed aspects by reading program instructions from memory 622, and executing the program instructions. The memory 622 may include a non-transitory computer-readable medium including one or more than one memory (e.g., RAM, ROM, and/or the like) or storage device (e.g., magnetic storage) that store data as well as computer programs/software. The memory 622 may store program modules that, when executed by the processor 620, perform one or more steps discussed herein. The search engine device 606 may further include a search engine 624 configured (e.g., processor, memory, program instructions, firmware, and/or the like) to process/execute a search query and search query context (e.g., received from the search application device 604) to generate a search engine result page (SERP) 636, as described herein. Here, generated SERPs 636 may be stored in a search result database 638 (e.g., in human-readable form, for further processing) and/or sent directly to the search application device 604 (e.g., in human-readable form for transmission to a client device 602A-602N). Here, although the search result database 638 is depicted as part of the search engine device 606, the search result database 638 may be external to the search engine device 606 (e.g., accessible via the network 608), and/or part of the search engine 624. Furthermore, although the search engine 624 is depicted as a separate component within search engine device 606, the search engine 624 may be a computer program executable from the memory 622. According to various aspects, the search engine 624 may include a search algorithm stack 626 including a plurality of search algorithms 628A-628N executable (e.g., in parallel or in sequence, depending on the search engine 624 and content construction) to identify search result documents from a corpora database(s) 630. In particular, the search algorithm stack 626 may include a QTD search algorithm 628A to identify and rank/re-rank search result documents from the corpora database(s) 630, as described herein. According to various aspects, one or more of the plurality of search algorithms 628A-628N may call for additional parameters (e.g., default settings, enchantments for efficiency or performance, search engine-specific parameters, parameters to be used in extended functionality, parameters to be used in the presence or absence of content or metadata in the corpora database(s) 630, and/or the like) during execution. In such aspects, the additional parameters may be read in from a search engine parameter database 637 (e.g., prior to and/or during execution of the respective search algorithm 628A-628N). For example, with respect to the QTD search algorithm 628A of the present disclosure, such additional parameters and/or QTD-specific parameter(s) 639 (e.g., default QTD parameters, parameters received via the search query context interface 618 as described herein, or the like) may be retrieved from the search engine parameter database 637 and/or the search query context interface 618 (e.g., to execute the QTD search algorithm 628A). For purposes of illustration, a user may be inputting a sentiment analysis search query and may define/input a series of negative sentiment words to be used as part of the QTD query as hidden terms. Here, a flag indicating that the search query is intended to return negative sentiment results might be included in the search query context interface 618, to trigger the use of the input hidden negative terms as QTD-specific parameters. According to some aspects, the search algorithm stack 626 may further include a default ranking algorithm 628B to initially rank search result documents from the corpora database(s) 630, as described herein. For example, the search engine 624 may execute the default ranking algorithm 628N to initially rank search result documents based on a number of different queries that the documents match (e.g., documents that match more queries may be ranked more highly than those documents that match fewer queries). The default ranking algorithm 628N, in other aspects, may initially rank search result documents based on document age, how cited, pointers to/from the document, and/or the like).

Although the corpora database 630 is depicted as external to the search engine device 606, it should be appreciated that the search engine device 606 may include the corpora database(s) 630. In some aspects, the corpora database(s) 630 may be housed on a separate computer device 631 accessible via the network 608. According to various aspects, each corpora database 630 may include content (e.g., documents) as well as metadata associated with each respective content.

In view of FIG. 6, the search application device 604 and the search engine device 606 are depicted as separate components of the QTD system 600. However in some aspects, the search application device 604 and the search engine device 606 may be combined as one search device 632 (depicted in phantom as optional).

The plurality of client devices 602A-602N, according to aspects described herein, may include a computer device (e.g., a personal computer, a cell phone, a network computer, a server, a mainframe computer, and/or the like). In some aspects, each of the plurality of client devices 602A-602N may be configured as a special purpose computer (e.g., a particular machine) designed specifically for performing the functionalities described herein. For example, one or more of the disclosed processing steps may be implemented on a field-programmable gate array ("FPGA"), application-specific integrated circuit ("ASIC"), or suitable chipset. Each of the plurality of client devices 602A-602N may include one or more than one processor 640A-640N that may be selectively activated and/or reconfigured by a computer program. In particular, each processor 640A-640N may perform steps or methods consistent with disclosed aspects by reading program instructions from memory 642A-642N, and executing the program instructions. The memory 642A-642N may include a non-transitory computer-readable medium including one or more than one memory (e.g., RAM, ROM, and/or the like) or storage device (e.g., magnetic storage) that store data as well as computer programs/software. The memory 642A-642N may store program modules that, when executed by the processor 640A-640N, perform one or more steps discussed herein.

In some aspects, a client device 602A may further include, for example, a web browser application 644A (e.g., stored in the memory 642A) configured to present a browser interface (e.g., a web-based interface) including one or more than one web page on a display of the client device 602A. In particular, the web browser application 644A may present a web page including the search query interface 616 and/or the search query context interface 618 as provided (e.g., via the network 608) by the search application 614 of the search application device 604. In such aspects, a user (e.g., of the client device 602A) may interact with the search application 614 via the search query interface 616 and/or the search query context interface 618, to execute a search query as described herein (e.g., by entering a search string into the search query interface 616 and/or search parameters into the search query context interface 618). In some aspects, the client device 602A may submit more than one search query (e.g., via the search application 614 of the search application device 604) at a time. The client device 602A may, in response to execution of the search query, receive a SERP 636, as described herein, from the search application device 604 (e.g., via the network 608) and present the SERP 636 to the user via the browser interface. The client device 602A may further include, in other aspects, a client-based search application 645A (e.g., similar to the search application 614 as described herein) to interact with the search engine device 606 directly (e.g., via the network 608) to execute the search query and view search results as described herein.

In other aspects, a client device 602N may further include an automated search application 647N (e.g., a software test framework, a compiler scripting application, and/or the like stored in the memory 642N) configured to directly interact (e.g., via an application programming interface, or the like) with the search application 614 of the search application device 604 to execute search queries (e.g., in an automated fashion) and receive search results as described herein.

Referring still to FIG. 6, the search query interface 616 of the search application device 604 may include various user interface elements for searching for documents in the corpora database(s) 630. For example, the search query interface 616 may include a query text box (not shown), where a user may enter a search string including search terms, numbers, symbols, and/or other descriptors of content (e.g., tokens) to be found via natural language (e.g., without Boolean logical operators) or structured language (e.g., search terms connected via Boolean logical operators). The search query interface 616 may further include a search button (not shown) for submitting the search query to the search engine 624 (e.g., via the search application device 604). The search query interface 616 may further display a SERP(s) 636, ranked as described herein, that match the user's search query.

Further in view of FIG. 6, the search query context interface 618 of the search application device 604 may include various user interface elements for setting parameters associated with the search query. For example, the search query context interface 618 may include drop down boxes (not shown), filters, and/or the like where a user may select parameters associated with the search query. Selectable parameters may include a defined proximity range, a maximum document rank value to be ranked or re-ranked, a description of a corpus or corpora to be searched (e.g., in corpora database(s) 630 or other specified database), default search algorithms of the search algorithm stack 626 (e.g., and associated parameters) to be executed, specialized and/or non-default search algorithms of the search algorithm stack 626 (e.g., and associated parameters) to be executed (e.g., the QTD search algorithm 628A, as described herein), metadata associated with the search (e.g., date, user identification, content restrictions or embargos, an expanded query, query intent information, and/or the like) or the like.

QTD Search Metric System

Still referring to FIG. 6, according to various aspects of the present disclosure, the QTD system 600 may also function as a QTD search metric system to provide relevance metrics for search result documents, SERPs 636, and/or the like, as described herein. In such aspects, a user (e.g., via the client device 602A) and/or an automated search application 647N (e.g., via the client device 602N) may interact with the search application 614 of the search application device 604 to execute a grouping or a listing of search queries at the same time. In one example, the automated search application 647N may include a search testing application where QTD is used as a metric to show relevance results for each search document result in a SERP 636. In another example, the automated search application 647N may include a compiler script that uses a group or a list of search queries for regression testing or comparison testing.

According to various aspects, the search query interface 616 of the search application 614 may include various user interface elements for inputting a grouping or a listing of search queries. For example, the search query interface 616 may include a plurality of text boxes (not shown) to input a plurality of search queries in each grouping or each listing of search queries, one or more relatively large text box(es) to cut and paste a plurality of search queries in each grouping or listing of search queries, an upload button to upload a plurality of search queries in each grouping or each listing of search queries, and/or the like. Further in such aspects, the search query context interface 618 of the search application 614 may include various user interface elements for setting parameters associated with each grouping or each listing of search queries (e.g., so that each query in each respective grouping or listing of search queries is processed the same). For example, the search query context interface 618 may include a text box(es) (not shown) for inputting a query identifier and/or contextual metadata associated with each grouping or each listing of search queries as well as drop down boxes (not shown), filters, and/or the like where a user may select parameters associated with each grouping or each listing of search queries. In some aspects, the parameters associated with a grouping or a listing of search queries may be the same as another grouping or listing of search queries. In other aspects the parameters associated with a grouping or a listing of search queries is particular to that grouping or listing (e.g., an identifier or name for a query set, a source(s) for the query set, a description for the query set, or the like). In some aspects, a set of parameters taking precedence for application order or priority may be a QTD-specific parameter(s) set 639.

According to various aspects, as a QTD search metric system, each grouping or each listing of search queries may be submitted via the search query interface 616 and the search query context interface 618 in a serial fashion (e.g., via the search application device 604) for execution by the search engine 624 of the search engine device 606 as described herein. In such aspects, the SERPs corresponding to each search query of each grouping or each listing of search queries may be saved in the search result database 638 for subsequent metric analysis as described herein.

It should now be understood that the systems and methods described herein rank or re-rank electronic documents of a search result by analyzing the proximity of query tokens to one another within each electronic document. More specifically, the systems and methods described herein rank or re-rank search result documents based on query tokens of a search string (e.g., natural language search string) and the proximity of each query token to other query tokens within a defined proximity range to generate an improved search engine result set. More relevant electronic documents are presented first in the search result list presented to the user.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for ranking electronic documents, the system comprising:
a search application device, comprising:
a processor and a non-transitory computer-readable medium including program instructions, the program instructions, when executed by the processor, causing the processor to:
receive, via one or more than one graphical user interface, a search query and a search query context, from a client device; and
a search engine device, comprising:
a processor and a non-transitory computer-readable medium including program instructions, the program instructions, when executed by the processor, cause the processor to:
determine a search result based on the search query and the search query context;
extract query tokens from the search query;
determine, one or more than one query token hit set within each document of the search result, wherein each query token hit set includes one or more than one query token hit within a defined proximity range of a query token centrally-located within the defined proximity range, wherein each query token hit is an instance of an individual query token in an individual document of the search result;
determine a query token density value (QTDV) between each query token hit and the centrally-located query token for each query token hit set within each document, wherein each QTDV is based on a distance between each query token hit and the centrally-located query token of each query token hit;
determine a query token density score (QTDS) for each query token hit set within each document;
determine a document density score (DDS) for each document;
rank or re-rank each document within the search result based on the DDS determined for each document; and
transmit a ranked or re-ranked search engine result page to the search application device for presentation via the client device.

2. The system of claim 1, wherein the distance is based on a count of words or tokens between each query token hit and the centrally-located query token of each query token hit.

3. The system of claim 1, wherein a query token hit set includes more than one query token hit within the defined proximity range of the centrally-located query token, and wherein the program instructions, when executed by the processor of the search engine device, further cause the processor to:
assign relatively higher QTDVs to query token hits that are relatively closer in proximity to the centrally-located query token of the query token hit set; and
assign relatively lower QTDVs to query token hits that are relatively further in proximity from the centrally-located query token of the query token hit set.

4. The system of claim 3, wherein each distance increment away from the centrally-located query token is associated with an increasingly discounted density value.

5. The system of claim 3, wherein each QTDV is based on a density function that applies a discount function to each distance increment away from the centrally-located query token.

6. The system of claim 5, wherein the discount function is one of: $1/HW$, $1/(\log HW)$, or $1/(HW)^2$, where HW is a half-width equal to half of the defined proximity range.

7. The system of claim 1, wherein a query token hit set includes one query token hit within the defined proximity range of the centrally-located query token, and wherein the program instructions, when executed by the processor of the search engine device, further cause the processor to: assign a QTDV to the query token hit set based on the decreasing weighted values.

8. The system of claim 1, wherein a query token hit set does not include a query token hit within the defined proximity range of the centrally-located query token, and wherein the program instructions, when executed by the processor of the search engine device, further cause the processor to:
assign a QTDV to the query token hit set equal to zero.

9. The system of claim 1, wherein the program instructions, when executed by the processor of the search engine device, further cause the processor to:
adjust at least one determined QTDV based on one or more than one of:
a repeated query token within the defined proximity range,
a token including a citation, an entity, a link, a flag, a semantic fact, or a sentiment term within the defined proximity range;
a query token within a particular document field; and
query tokens in the same order in the document as in the search query.

10. The system of claim 1, wherein ranking or re-ranking each document within the search result further includes boosting or de-boosting each document based on its respective rank in an initial search result.

11. The system of claim 1, wherein the program instructions, when executed by the processor of the search engine device, further cause the processor to:
apply the DDS determined for each document as a relevance metric to rank or re-rank the search results relative to a maximum rank value, to measure an overall relevance of the ranked or re-ranked search engine result page, or to trim documents from the ranked or re-ranked search engine result page.

12. The system of claim 1, wherein the program instructions, when executed by the processor of the search application device, further cause the processor to:
receive, via a search query context interface, at least one of the defined proximity range, a corpus database to search, a maximum document rank value for ranking or re-ranking, or a search algorithm to be applied.

13. The system of claim 1, wherein:
the QTDS is determined by summing the QTDVs of each query token hit set; and
the DDS is determined by summing the QTDS of each document.

14. A search engine, comprising:
a processor and a non-transitory computer-readable medium including program instructions, the program instructions, when executed by the processor, cause the processor to:
execute a search query and a search query context to determine an initial search result;
extract query tokens from the search query;

extract a defined proximity range;
determine, one or more than one query token hit set within each document of the initial search result, wherein each query token hit set includes one or more than one query token hit within the defined proximity range of a query token centrally-located within the defined proximity range, and wherein each query token hit is an instance of an individual query token in an individual document of the search result;
determine a query token density value (QTDV) between each query token hit and the centrally-located query token for each query token hit set within each document, wherein each QTDV is based on a distance between each query token hit and the centrally-located query token of each query token hit;
determine a query token density score (QTDS) for each query token hit set within each document;
determine a document density score (DDS) for each document; and
re-rank each document within the initial search result based on the DDS determined for each document to generate a re-ranked search engine result page.

15. The search engine of claim 14, wherein the program instructions, when executed by the processor, further cause the processor to:
transmit the re-ranked search engine result page to at least one of a search application device or a search engine result database.

16. The search engine of claim 14, wherein the distance is based on a count of words or tokens between each query token hit and the centrally-located query token of each query token hit.

17. The search engine of claim 14:
wherein when a query token hit set:
includes more than one query token hit within the defined proximity range of the centrally-located query token, the program instructions further cause the processor to:
assign relatively higher QTDVs to query token hits that are relatively closer in proximity to the centrally-located query token of the query token hit set; and
assign relatively lower QTDVs to query token hits that are relatively further in proximity from the centrally-located query token of the query token hit set;
includes one query token hit within the defined proximity range of the centrally- located query token, the program instructions further cause the processor to:
assign a QTDV to the query token hit set based on weighted values that decrease with each distance increment away from the centrally- located query token; and
does not include a query token hit within the defined proximity range of the centrally-located query token, the program instructions further cause the processor to:
assign a QTDV to the query token hit set equal to zero.

18. The search engine of claim 14, further comprising:
a search engine parameter database, wherein the defined proximity range is extracted from the search engine parameter database.

19. A computer-implemented method for ranking electronic documents, the method comprising:
receiving, via a search application device, a search query and a search query context;
determining, via a search engine, a search result based on the search query and the search query context; and
executing a query token density algorithm of the search engine to:
extract query tokens from the search query;
determine, one or more than one query token hit set within each document of the search result, wherein each query token hit set includes one or more than one query token hit within a defined proximity range of a query token centrally-located within the defined proximity range, and wherein each query token hit is an instance of an individual query token in an individual document of the search result;
determine a query token density value (QTDV) between each query token hit and the centrally-located query token for each query token hit set within each document, wherein each QTDV is based on a distance between each query token hit and the centrally-located query token of each query token hit;
determine a query token density score (QTDS) for each query token hit set within each document;
determine a document density score (DDS) for each document;
rank or re-rank each document within the search result based on the DDS determined for each document; and
transmit a ranked or re-ranked search engine result page to the search application device for presentation via a client device.

20. The computer-implemented method of claim 19, further comprising:
when a query token hit set:
includes more than one query token hit within the defined proximity range of the centrally-located query token:
assigning relatively higher QTDVs to query token hits that are relatively closer in proximity to the centrally-located query token of the query token hit set; and
assigning relatively lower QTDVs to query token hits that are relatively further in proximity from the centrally-located query token of the query token hit set;
includes one query token hit within the defined proximity range of the centrally- located query token:
assigning a QTDV to the query token hit set based on weighted values that decrease with each distance increment away from the centrally- located query token; or
does not include a query token hit within the defined proximity range of the centrally-located query token:
assigning a QTDV to the query token hit set equal to zero.

* * * * *